(12) United States Patent
Drummond

(10) Patent No.: US 10,947,020 B1
(45) Date of Patent: Mar. 16, 2021

(54) METHOD OF MOLDING COMPLEX STRUCTURES AND AN ENCLOSURE COVER MADE BY SAID METHOD

(71) Applicant: Franklin Electric Co., Inc., Fort Wayne, IN (US)

(72) Inventor: Bryan D. Drummond, Bluffton, IN (US)

(73) Assignee: FRANKLIN ELECTRIC CO., INC., Fort Wayne, IN (US)

( * ) Notice: Subject to any disclaimer, the term of this patent is extended or adjusted under 35 U.S.C. 154(b) by 224 days.

(21) Appl. No.: 15/984,079

(22) Filed: May 18, 2018

Related U.S. Application Data

(60) Provisional application No. 62/508,978, filed on May 19, 2017.

(51) Int. Cl.
```
B65D 51/16      (2006.01)
B29C 45/26      (2006.01)
B29L 31/56      (2006.01)
B65D 1/22       (2006.01)
```

(52) U.S. Cl.
CPC ...... B65D 51/1611 (2013.01); B29C 45/2628 (2013.01); B65D 1/22 (2013.01); *B29L 2031/565* (2013.01)

(58) Field of Classification Search
CPC ... B65D 51/1611; B65D 1/22; B29C 45/2628; B29L 2031/565
USPC .... 220/367.1, 370, 4.21, 3.94, 4.02, 3.2, 3.8
See application file for complete search history.

(56) References Cited

U.S. PATENT DOCUMENTS

| | | | | |
|---|---|---|---|---|
| 6,193,089 B1* | 2/2001 | Yu | ........................ | B65D 45/02 |
| | | | | 220/327 |
| 6,644,494 B2* | 11/2003 | Hayes | ............... | B65D 21/0219 |
| | | | | 206/508 |
| 8,011,531 B2* | 9/2011 | Vovan | ............... | B65D 43/0212 |
| | | | | 220/771 |
| 8,017,865 B1* | 9/2011 | Baldwin | .................. | H02G 3/14 |
| | | | | 174/66 |
| 10,666,030 B2* | 5/2020 | Dinh | ........................ | H02G 3/14 |
| 2009/0200298 A1* | 8/2009 | Nakayama | ............. | H02G 3/081 |
| | | | | 220/3.8 |
| 2020/0091666 A1* | 3/2020 | Yoshihara | ............ | H01R 25/165 |

* cited by examiner

*Primary Examiner* — J. Gregory Pickett
*Assistant Examiner* — Niki M Eloshway
(74) *Attorney, Agent, or Firm* — Faegre Drinker Biddle & Reath LLP

(57) ABSTRACT

A one-piece part and a method of making the one-piece part. The one-piece part comprises an upper wall; a lower wall having an exterior portion and an interior portion, the interior portion overlapping the upper wall; lateral walls connecting the upper wall to the lower wall; an intermediate wall connecting the upper wall to the lower wall, the intermediate wall extending longitudinally between the lateral walls; a bottom wall connecting the lateral walls and the lower wall; and a top wall connecting the lateral walls and the upper wall, wherein the lateral walls, the top wall, the bottom wall, the exterior portion of the lower wall, the intermediate wall, and the upper wall have exterior surfaces and interior surfaces, the interior surfaces defining a volume of the one-piece part, and wherein the interior portion of the lower wall extends into said volume.

21 Claims, 13 Drawing Sheets

METHOD OF MOLDING COMPLEX STRUCTURES AND AN ENCLOSURE COVER MADE BY SAID METHOD

CROSS-REFERENCE TO RELATED APPLICATIONS

The present application claims the benefit of U.S. Patent Application No. 62/508,978 filed May 19, 2017, which is incorporated by reference herein in its entirety.

FIELD OF THE DISCLOSURE

The disclosure relates generally to a method of molding complex structures. More particularly, the disclosure relates to a method of molding structures with overlapping surfaces and an enclosure cover made by said method.

BACKGROUND OF THE DISCLOSURE

Enclosures protect contents positioned therein from contact with the environment and from personnel contact with hazardous parts. If the contents comprise electronic components, the enclosure may also include intake and discharge openings to permit air to flow therein to extract heat generated by the electronic components. Air may flow from the intake to the discharge opening by convection or a fan may be included to force air circulation. The enclosure may be mounted outdoors. Outdoor enclosures may have louvers over the discharge openings to limit ingress of rain water. A NEMA 3R enclosure must provide a degree of protection with respect to harmful effects on the equipment due to the ingress of water (rain, sleet, snow) and should not be damaged by the external formation of ice on the enclosure. Enclosures should also be inexpensive and last a long time. The outer surfaces of enclosures may have finely textured surfaces to increase their appeal and branding.

It is desirable to improve processes to form complex structures with varying functional and aesthetic requirements.

SUMMARY

A one-piece part and a method of making the one-piece part are provided. In some embodiments, the one-piece part comprises an upper wall; a lower wall having an exterior portion and an interior portion, the interior portion overlapping the upper wall; lateral walls connecting the upper wall to the lower wall; an intermediate wall connecting the upper wall to the lower wall, the intermediate wall extending longitudinally between the lateral walls; a bottom wall connecting the lateral walls and the lower wall; and a top wall connecting the lateral walls and the upper wall, wherein the lateral walls, the top wall, the bottom wall, the exterior portion of the lower wall, the intermediate wall, and the upper wall have exterior surfaces and interior surfaces, the interior surfaces defining a volume of the one-piece part, and wherein the interior portion of the lower wall extends into said volume.

In some embodiments, an enclosure is provide. The enclosure includes a base and a one-piece cover comprising an upper wall; a lower wall having an exterior portion and an interior portion, the interior portion overlapping the upper wall; lateral walls connecting the upper wall to the lower wall; an intermediate wall connecting the upper wall to the lower wall, the intermediate wall extending longitudinally between the lateral walls; a bottom wall connecting the lateral walls and the lower wall; and a top wall connecting the lateral walls and the upper wall, wherein the lateral walls, the top wall, the bottom wall, the exterior portion of the lower wall, the intermediate wall, and the upper wall have exterior surfaces and interior surfaces, the interior surfaces defining a volume of the one-piece part, and wherein the interior portion of the lower wall extends into said volume.

In some embodiments, a method of forming a one-piece part is provided, the one-piece part comprising an upper wall, a lower wall having an exterior portion and an interior portion, the interior portion overlapping the upper wall, lateral walls connecting the upper wall to the lower wall, a top wall, a bottom wall, and an intermediate wall connecting the upper wall to the lower wall, the intermediate wall extending longitudinally between two of the lateral walls, wherein the lateral walls, the exterior portion of the lower wall, the intermediate wall, the top wall, the bottom and the upper wall have exterior surfaces and interior surfaces, the interior surfaces defining a volume of the one-piece part, and wherein the interior portion of the lower wall extends into said volume, the method comprising: providing a mold comprising a top die, a bottom die, and a slide including a head and a stem, the head having an upper surface, an intermediate surface, and a lower surface, and the top die comprising an upper surface, an intermediate surface, and a lower surface; positioning the bottom die and the slide adjacent the top die with the intermediate surface of the head of the slide adjacent the intermediate surface of the top die; filling the cavity with material; waiting until the material to solidifies; moving the slide away from the intermediate surface of the top die until the lower surface of the slide clears the interior portion of the lower wall; separating the top die and the bottom die; and releasing the one-piece part from the bottom die or the top die.

DESCRIPTION OF THE DRAWINGS

The features and advantages of the disclosure will become more readily appreciated as the same become better understood by reference to the following detailed description when taken in conjunction with the accompanying drawings, where.

Figure 1:
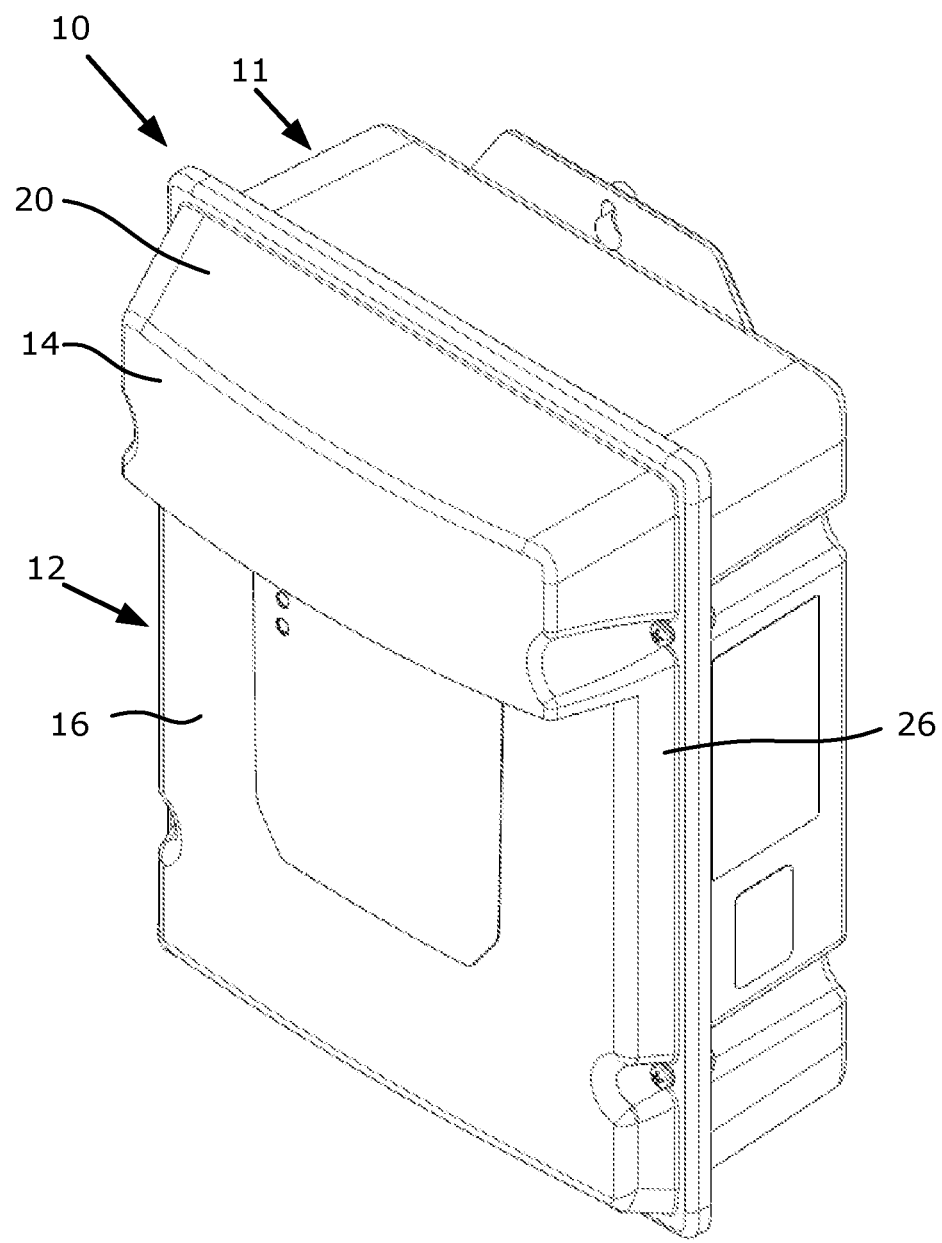
FIG. 1 is a perspective view of a enclosure having a cover attached to a body.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention.

DETAILED DESCRIPTION OF DISCLOSED EMBODIMENTS

For the purpose of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. No limitation of the scope of the invention is thereby intended.

Except where a contrary intent is expressly stated, terms are used in their singular form for clarity and are intended to include their plural form.

Occurrences of the phrase "in one embodiment," or "in one aspect," herein do not necessarily all refer to the same embodiment or aspect.

The terms top and bottom refer in the figures to the top and bottom of the figure. Thus when the terms are used to describe parts, such as top and bottom parts or walls, the top part is, generally, the part closest to the top of the figure and the bottom part is the part closest to the bottom of the figure. With reference to an enclosure or cover, the top part is the part that is above the bottom part when the enclosure is mounted correctly in use.

Figure 2:
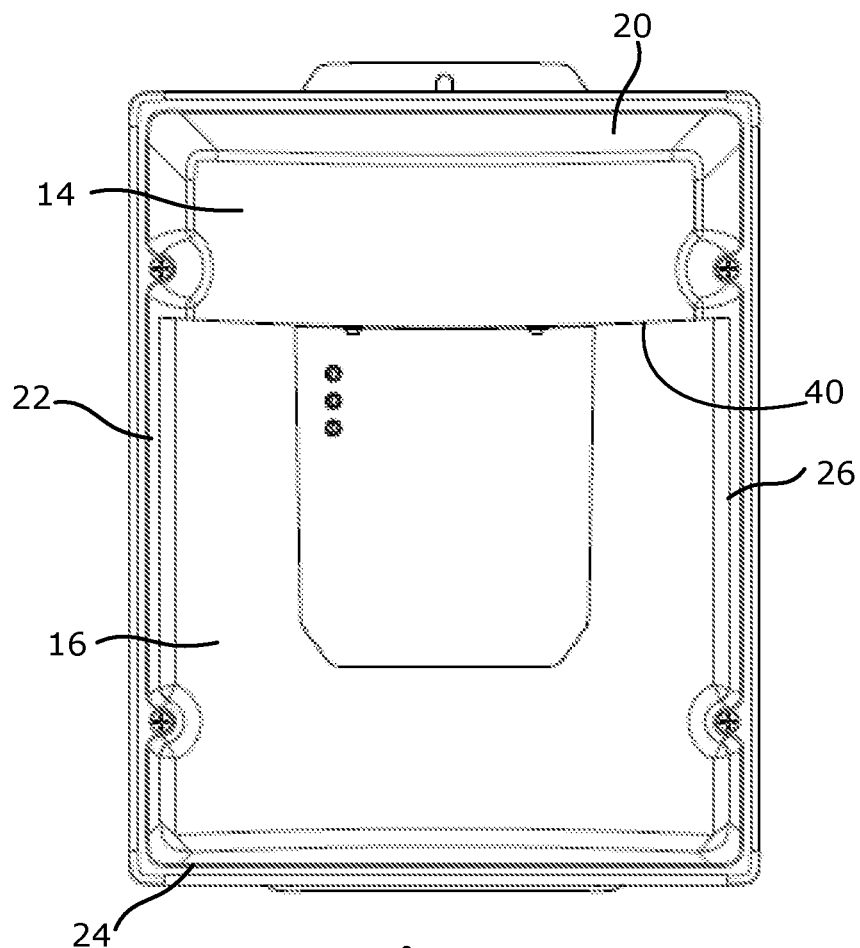
FIGS. 2 and 3 are front and bottom views of the enclosure of FIG. 1.
Figure 3:
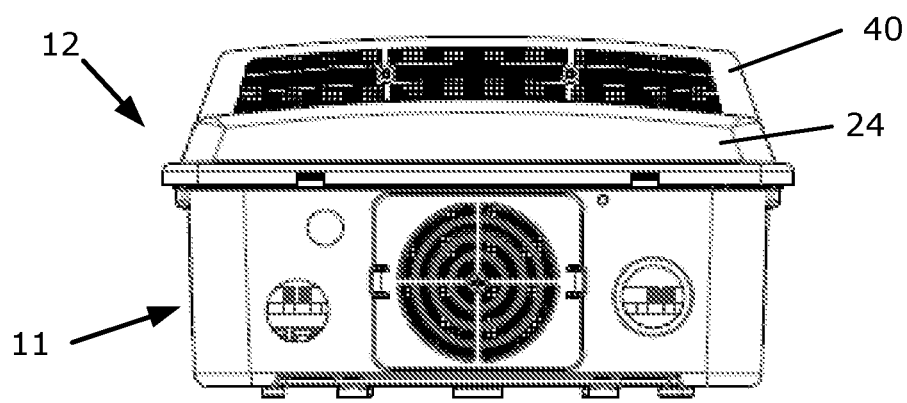

Embodiments of the disclosure, and others, will now be described with reference to the figures. FIGS. 1-3 depict an enclosure 10 including body 11 and a cover 12, which when attached form an enclosure volume. Cover 12 comprises an upper wall 14 overlapping a portion of a lower wall 16, and lateral walls 24 and 26. FIGS. 2 and 3 show the front and bottom sides of enclosure 10, including top and bottom walls 20 and 22, and an intermediate wall 40. In the present embodiment lateral walls 24, 26, and top and bottom walls 20, 22 extend from a first plane toward a second plane on which lower wall 16 lies. A portion of lateral walls 24, 26 extends further to a third plane on which upper wall 14 lies. Upper wall 14 and lower wall 16 may lie substantially on parallel planes. The molding process described herein enables one-shot formation of enclosure cover 12 without marring its external surface. It should be understood that the process described below is applicable to any molded structure. The structures may comprise any material suitable for molding a part. It should be understood that portions of the process described below are applicable to form complex parts by any suitable process in which dies are used to form a cavity having the shape of the part. Examples of processes include molding, potting, and any other process in which a material is solidified in a cavity formed by dies. Mounting holes 30 are placed adjacent the walls. The walls include curved portions 32 which permit insertion of screws through mounting holes 30 to secure cover 12 to body 11. Enclosure 10 as shown includes a bottom air intake with a fan adjacent thereto to force air therethrough.

Figure 4:
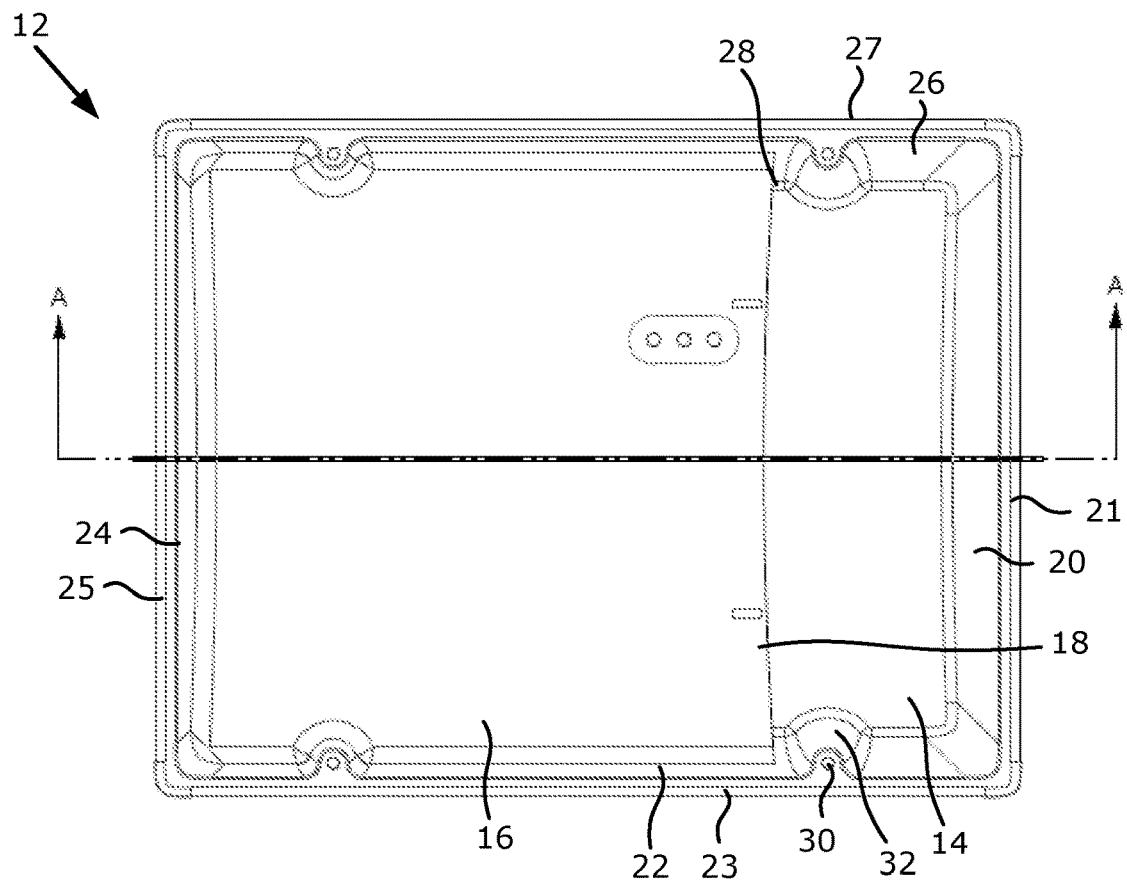
FIG. 4 is a view of the cover of FIG. 1 taken from the inside of the enclosure.
Figure 5:
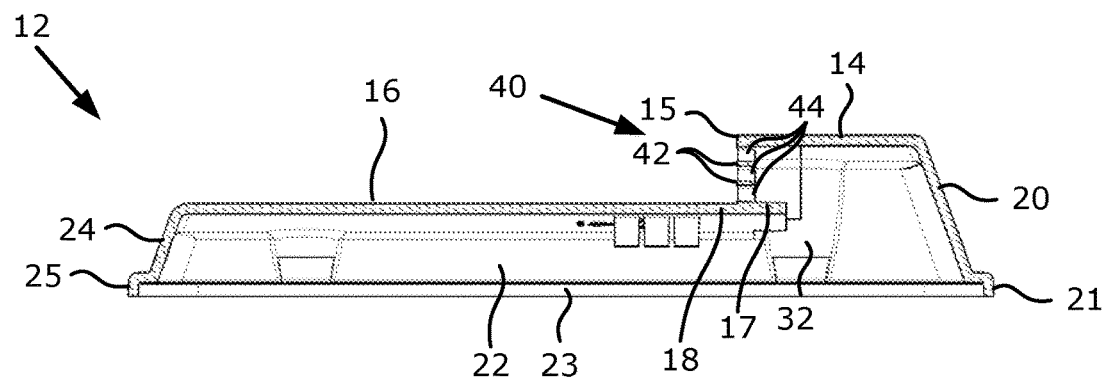
FIG. 5 is a view of a cross-section of the cover of FIG. 1.

FIG. 4 depicts the inside surface of enclosure cover 12 and FIG. 5 depicts a vertical cross-section view of enclosure cover 12. Referring to FIG. 4, enclosure cover 12 also comprises, surrounding upper wall 14 and lower wall 16, lips 21, 23, 25, and 27 extending from walls 20, 22, 24, and 26, respectively. Referring to FIG. 5, upper wall 14 has an edge 15 extending substantially from left wall 22 to right wall 26. Intermediate wall 40 extends from edge 15 to lower wall 16. Lower wall 16 has an interior portion 17 and an exterior portion 18 defined by where the edge of intermediate wall 40 contacts lower wall 16. The lateral walls, the exterior portion of the lower wall, the intermediate wall, and the upper wall have exterior surfaces and interior surfaces, the interior surfaces defining a volume of the one-piece part, the interior portion of the lower wall extending into said volume. The terms upper and lower denote a spatial relationship related to the overlap between the upper and lower walls. The terms exterior and interior refer to the volume defined by the cover and the base, with the interior being the interior of the enclosure. Upper wall 14 overlaps interior portion 17 to prevent ingress of rain water into the volume. Intermediate wall 40 includes one or more rib 42 forming a through-hole 44. Three through-holes 44 are shown between two ribs 42. More or less through-holes 44 may be formed. In use, air flows out of the enclosure through through-holes 44. The through-holes in the intermediate wall are formed simultaneously with forming the rest of the part in a single solidification step. As used herein, solidification signifies the step of allowing the materials that comprise the part to solidify into a solid part. Solid materials including fibers, beads, and particulate matter can be added to the base material, e.g. a polymer, to satisfy various strength, thermal conductivity, electromagnetic radiation containment requirements.

Figure 6A:
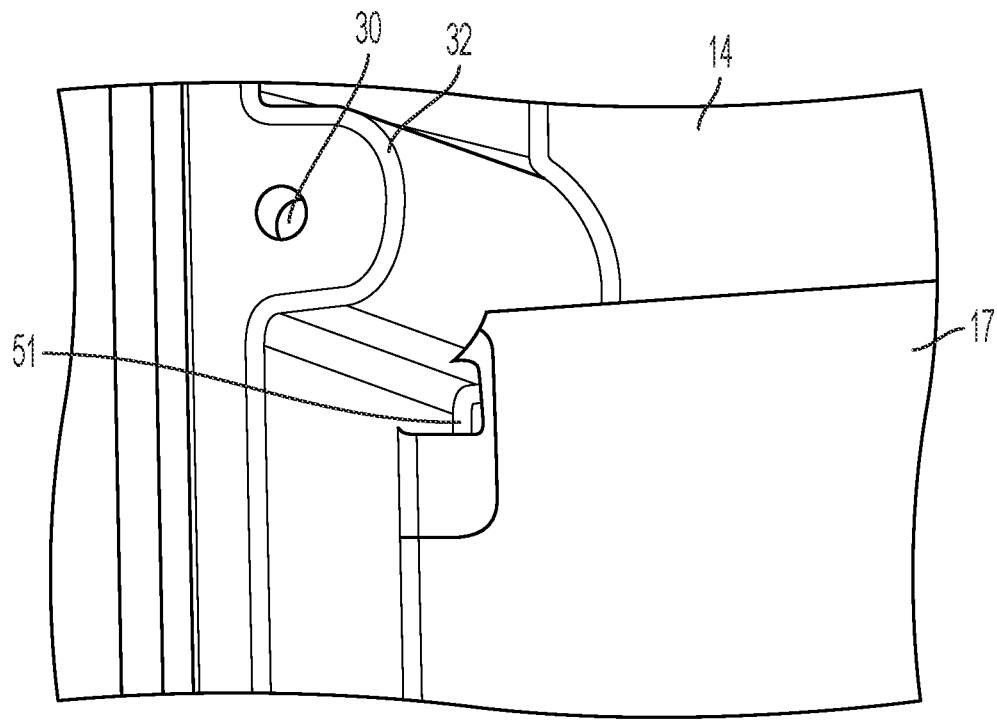
FIGS. 6A and 6B are perspective views of a section of the cover of FIG. 1.
Figure 6B:
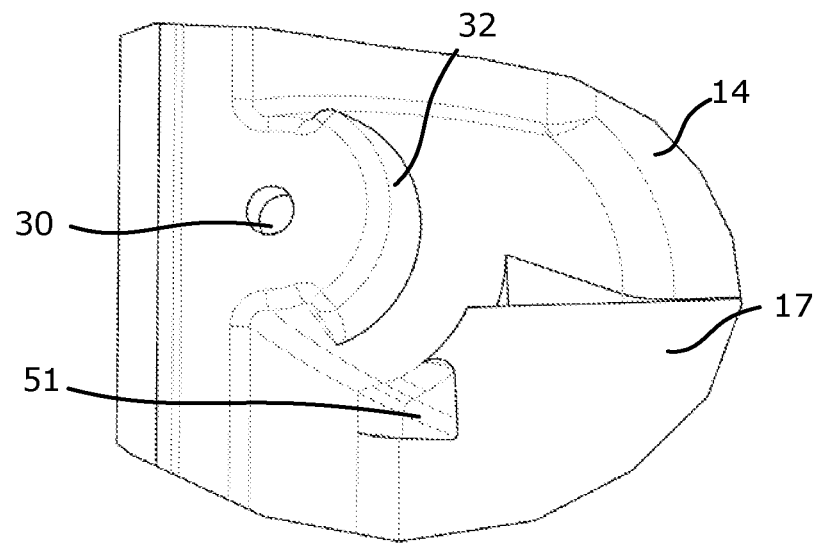
Figure 7:
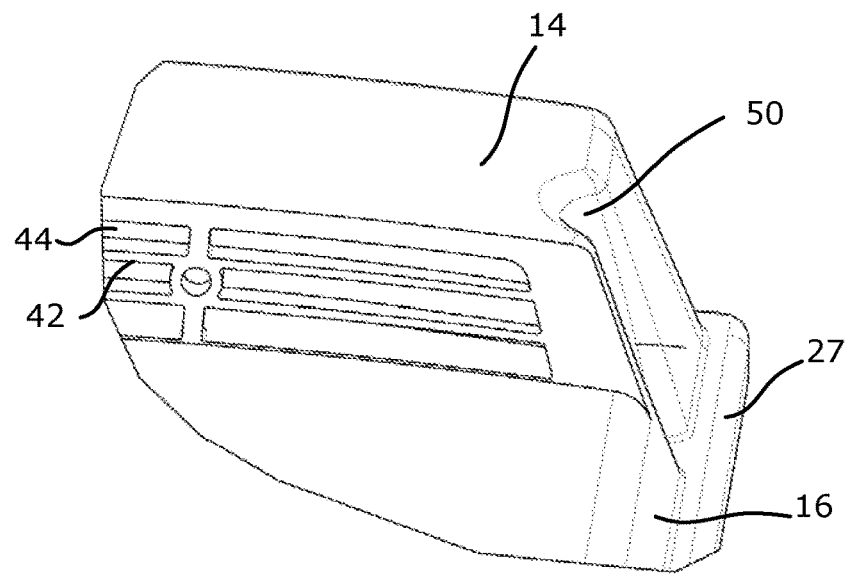
FIG. 7 is a perspective view of another section of the cover of FIG. 1.
Figure 8:
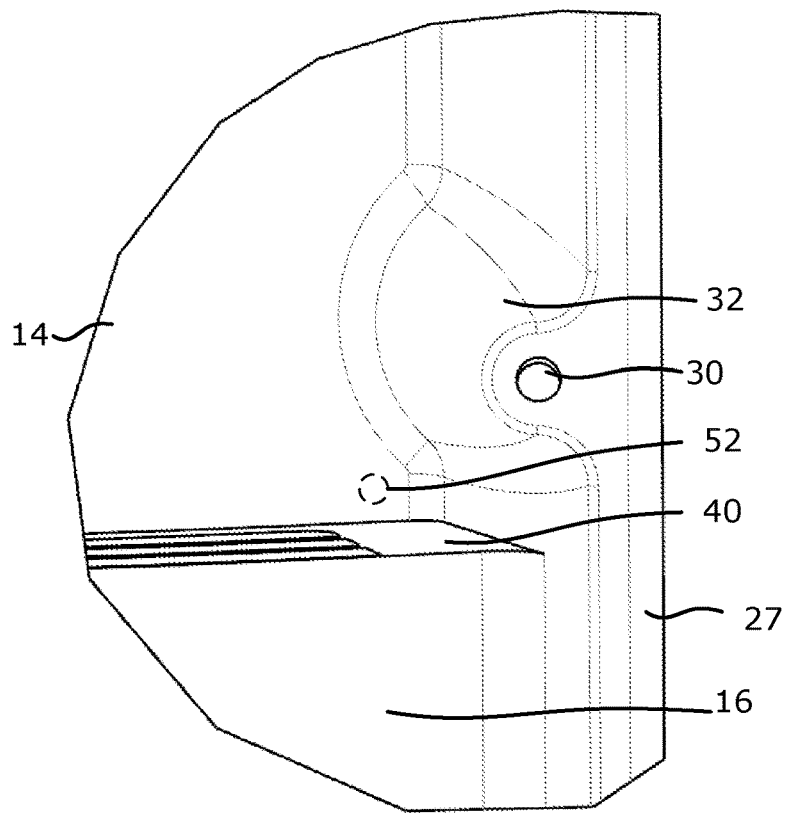
FIG. 8 is a perspective view of another section of the cover of FIG. 1.

FIGS. 6A and 6B depict a portion of cover 12 including a curved portion 32 extending from upper wall 14 to lower wall 16 e.g. interior portion 17. A blind-hole 51 is optionally formed for reasons described below.

In a variation of the present embodiment, the interior portion of the lower wall extends from the intermediate wall toward the upper wall and the exterior portion of the lower wall extends from the intermediate wall away from the upper wall. In one example, the interior portion 17 and the exterior portion 18 lie on a common plane. In a further example, the intermediate wall comprises parallel ribs 42, and the cavities comprise through-holes 44 formed between the ribs. The ribs may have surfaces that lie in planes that are parallel to lower wall. The thickness of a rib may decrease from the exterior to the interior sides to facilitate removal of a slide, described below.

Referring to FIGS. 6A and 6B, 7, and 8, in a variation of the present embodiment, at least one of the lateral walls comprise a curved portion 32, shown in FIGS. 6A and 6B, adjacent the intermediate wall, and a blind hole 51 extending between the interior portion 17 of the lower wall 16 and the upper wall 14, and adjacent curved portion 32. The juncture of the walls creates an area that has more material than other areas, as a result of the spacing required to move the dies. The additional material shrinks after it cools (in an injection molding process), creating a surface imperfection 52. The imperfection can be mitigated or eliminated by forming the blind hole to remove excess material, such that every part of the walls has substantially the same thickness. Blind hole 51 is coaxial with imperfection 52.

Figure 9:
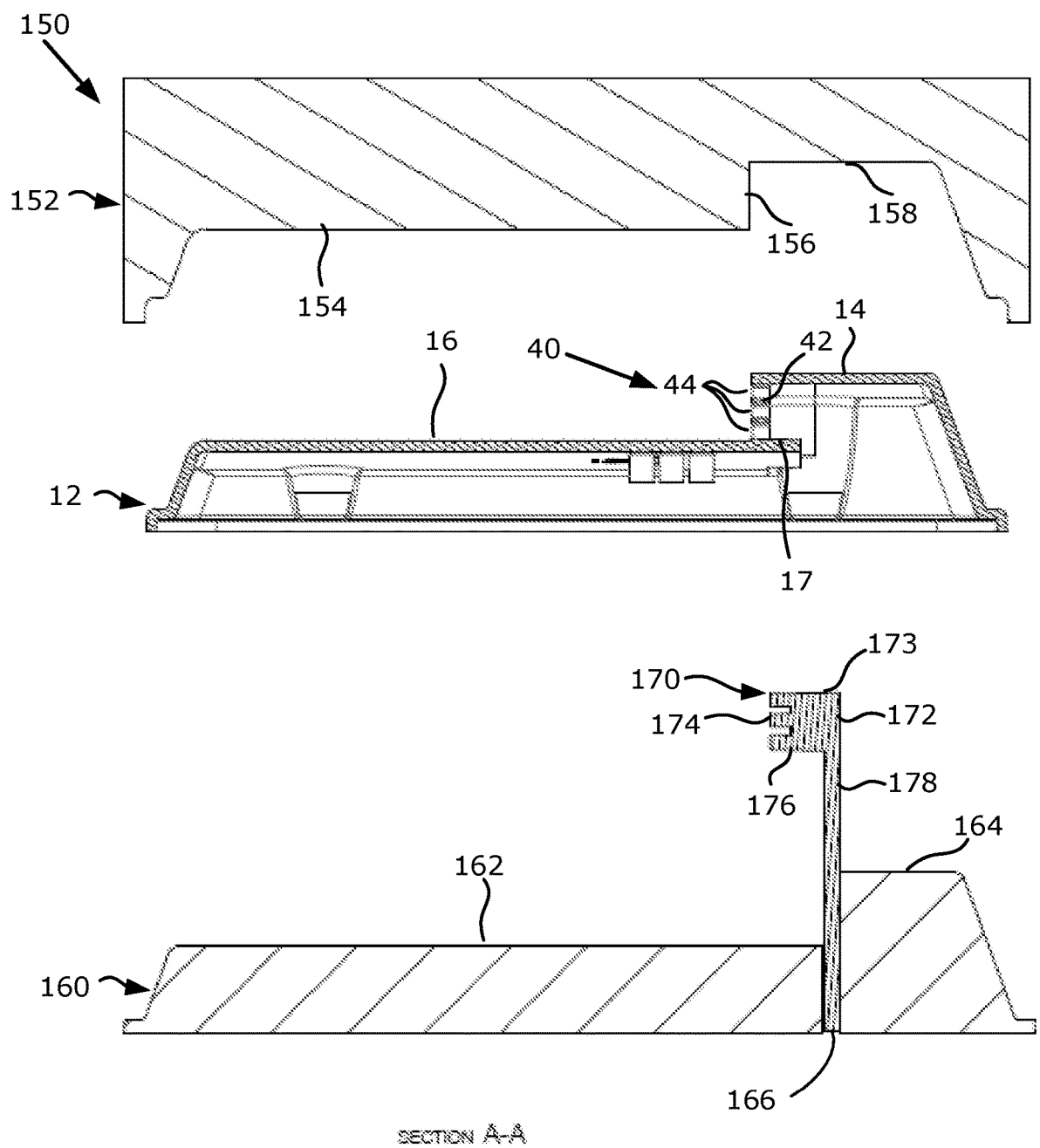
FIG. 9 is a view of a mold with the cover of FIG. 1 intermediate the dies which form the mold.

Referring now to FIGS. 9-17, a method of forming the one-piece part will now be described. FIG. 9 illustrates a mold 150 having a top die 152, a bottom die 160, and a slide 170, shown with enclosure cover 12 therebetween. The one-piece part may be enclosure cover 12, or any part comprising an upper wall, a lower wall having an exterior portion and an interior portion, the interior portion overlapping the upper wall, lateral walls connecting the upper wall to the lower wall, and an intermediate wall connecting the upper wall to the lower wall, the intermediate wall extending longitudinally between two of the lateral walls, wherein the lateral walls, the exterior portion of the lower wall, the intermediate wall, and the upper wall have exterior surfaces and interior surfaces, the interior surfaces defining a volume of the one-piece part, and wherein the interior portion of the lower wall extends into said volume.

Figure 10:
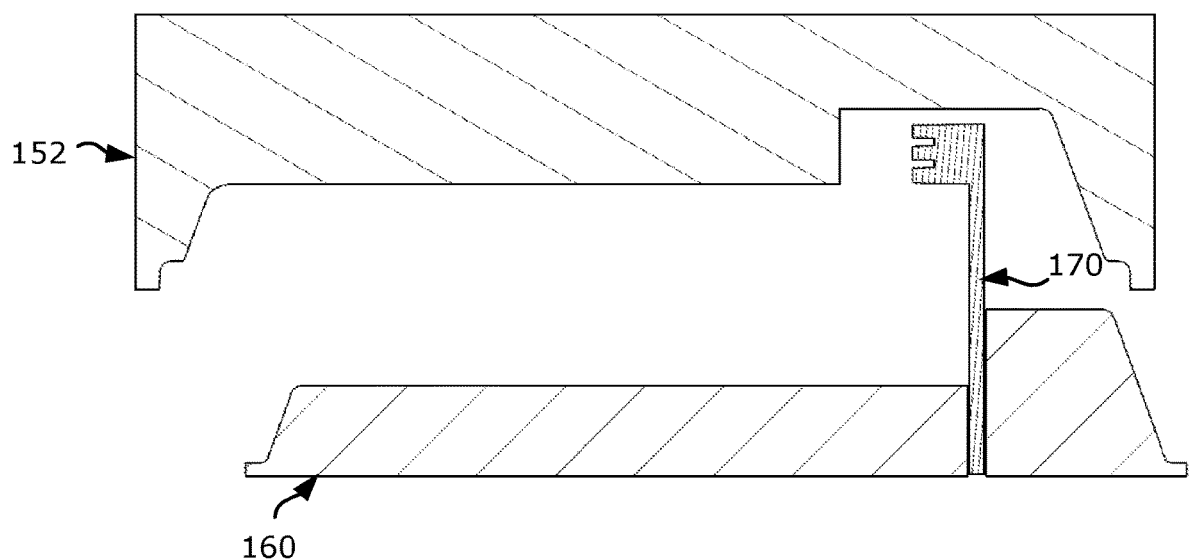
FIGS. 10 and 11 are views of the mold of FIG. 9.
Figure 11:
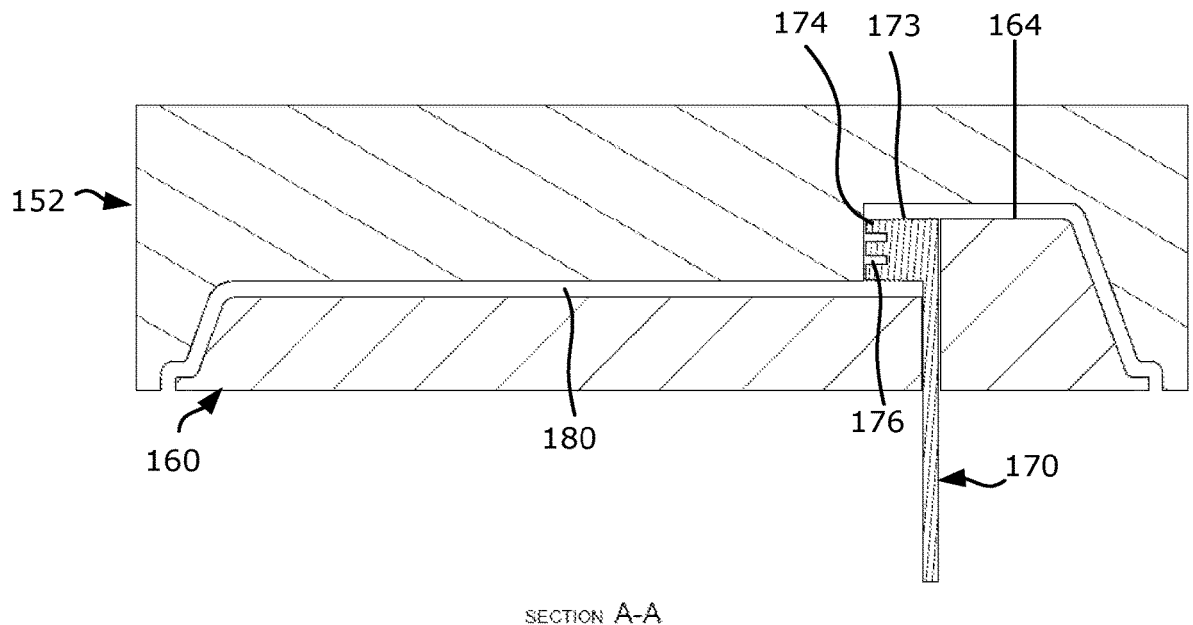

The method is described in a flowchart 200 (FIG. 17) and will be better understood with reference to FIGS. 10-16. The method comprises, at 202, by providing mold 150. Slide 170 includes a head 172 and a stem 178, the head having an upper surface 173, an intermediate surface 174, and a lower surface 176, and the top die comprising an upper surface 158, an intermediate surface 156, and a lower surface 154. In FIG. 10 the bottom die is longitudinally offset from the top die by a distance "d" shown in FIG. 14.

At 204, the method continues by positioning the bottom die and the slide adjacent the top die with the intermediate surface of the head of the slide separated from the intermediate surface of the top die by a desired thickness of the intermediate wall of the part to be formed. The surfaces of the top and bottom dies are also separated by the thickness. After positioning, the top die, the bottom die, and the slide cooperate to define a cavity 180, shown in FIG. 11. Bottom die 160 has a cavity 166 that slidingly receives stem 178 of slide 170. Slide 170 moves to facilitate positioning and withdrawal after the part has been formed. Movement of the dies to position them as described can be performed manually or, preferably, in an automated operation.

Figure 12:
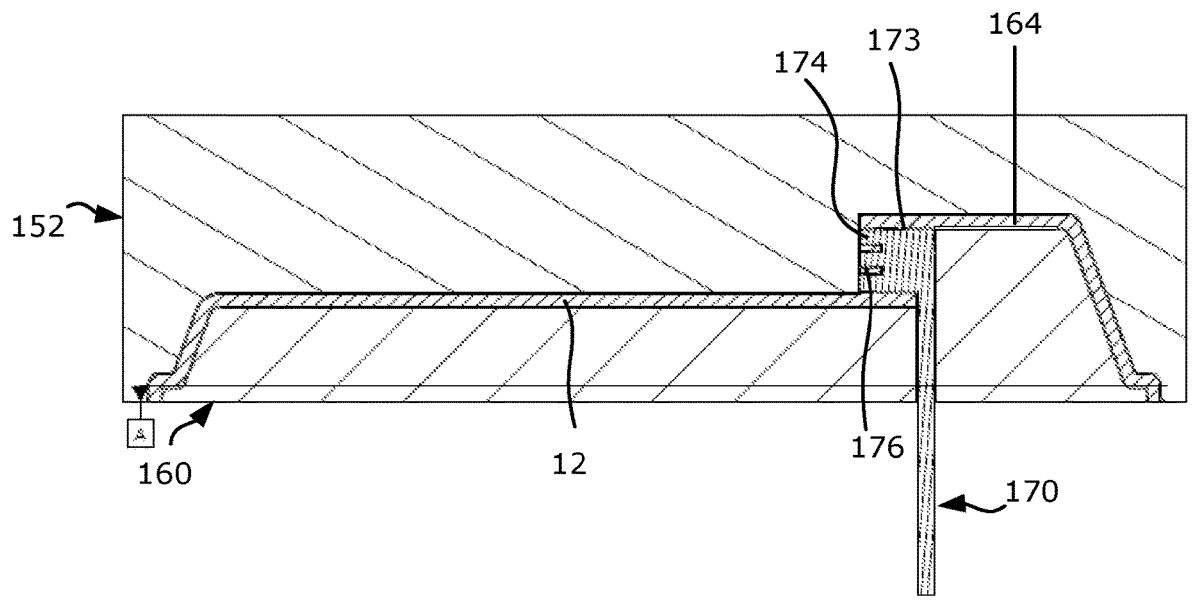
FIG. 12-16 are views of the mold of FIG. 9 with the cover of FIG. 1 intermediate the dies, with the dies in different positions relative to each other.
Figure 13:
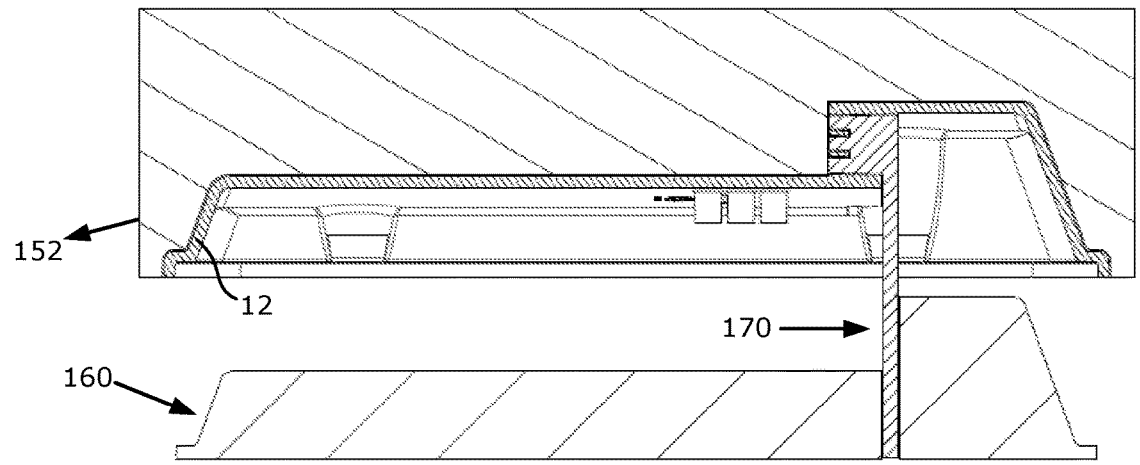

At 208, the method continues by filling the cavity with material. The material may comprise a polymer with or without particulate fillers. The material may be provided before positioning. The terms top and bottom die refer to the illustrated orientation but the dies may be oriented in any manner during the process, including an orientation that permits the bottom die to retain material before said positioning. Filling of the cavity includes partially filling the cavity. In one example, the material expands due to a chemical reaction to fill the cavity. FIG. 12 shows the cavity filled with the material.

Figure 14:
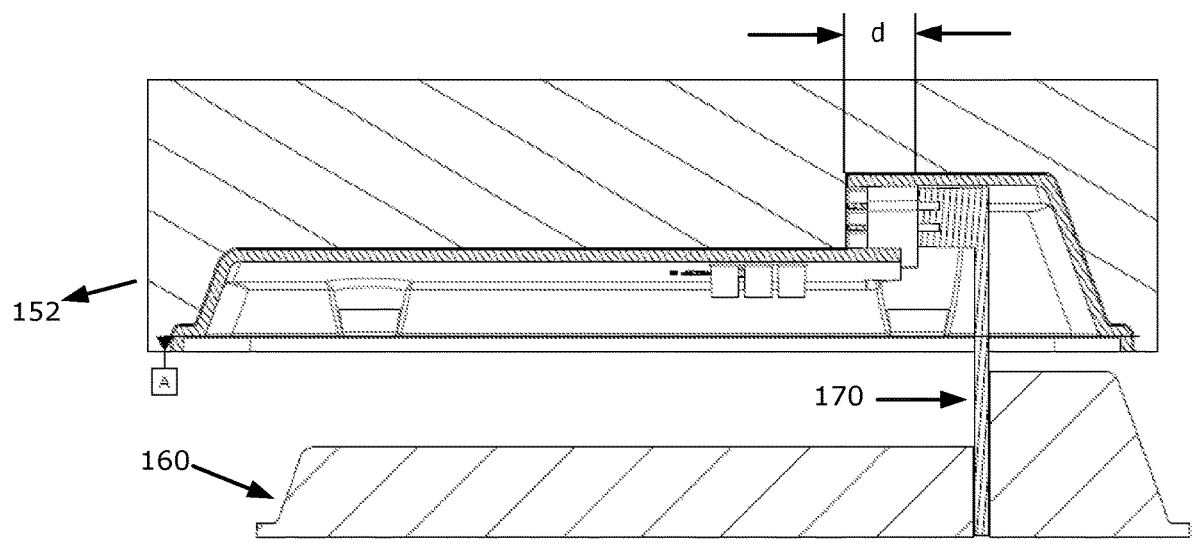
Figure 15:
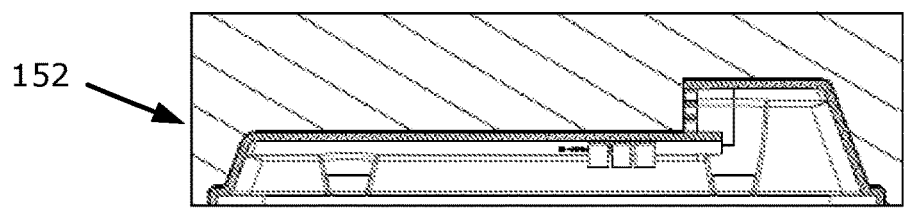
Figure 15:
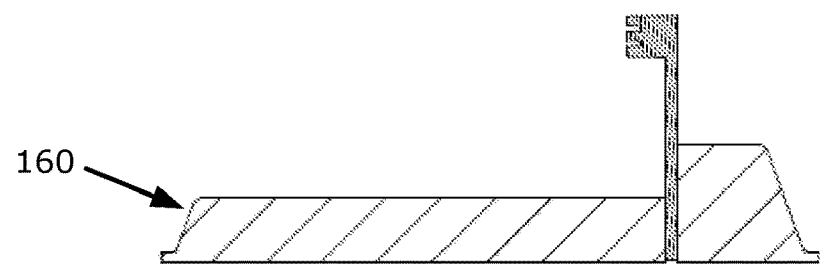
Figure 16:
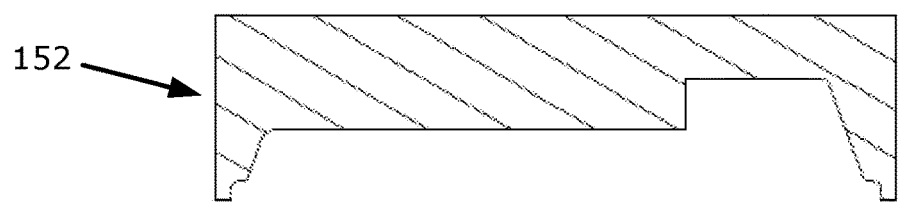
Figure 16:
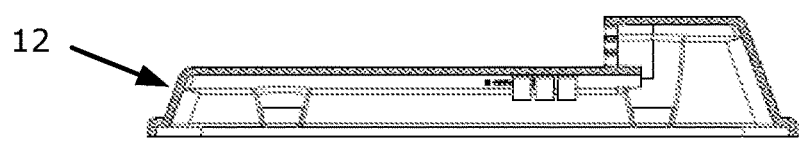
Figure 16:
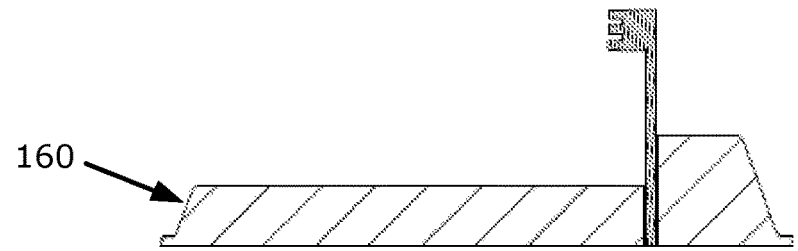
Figure 17:
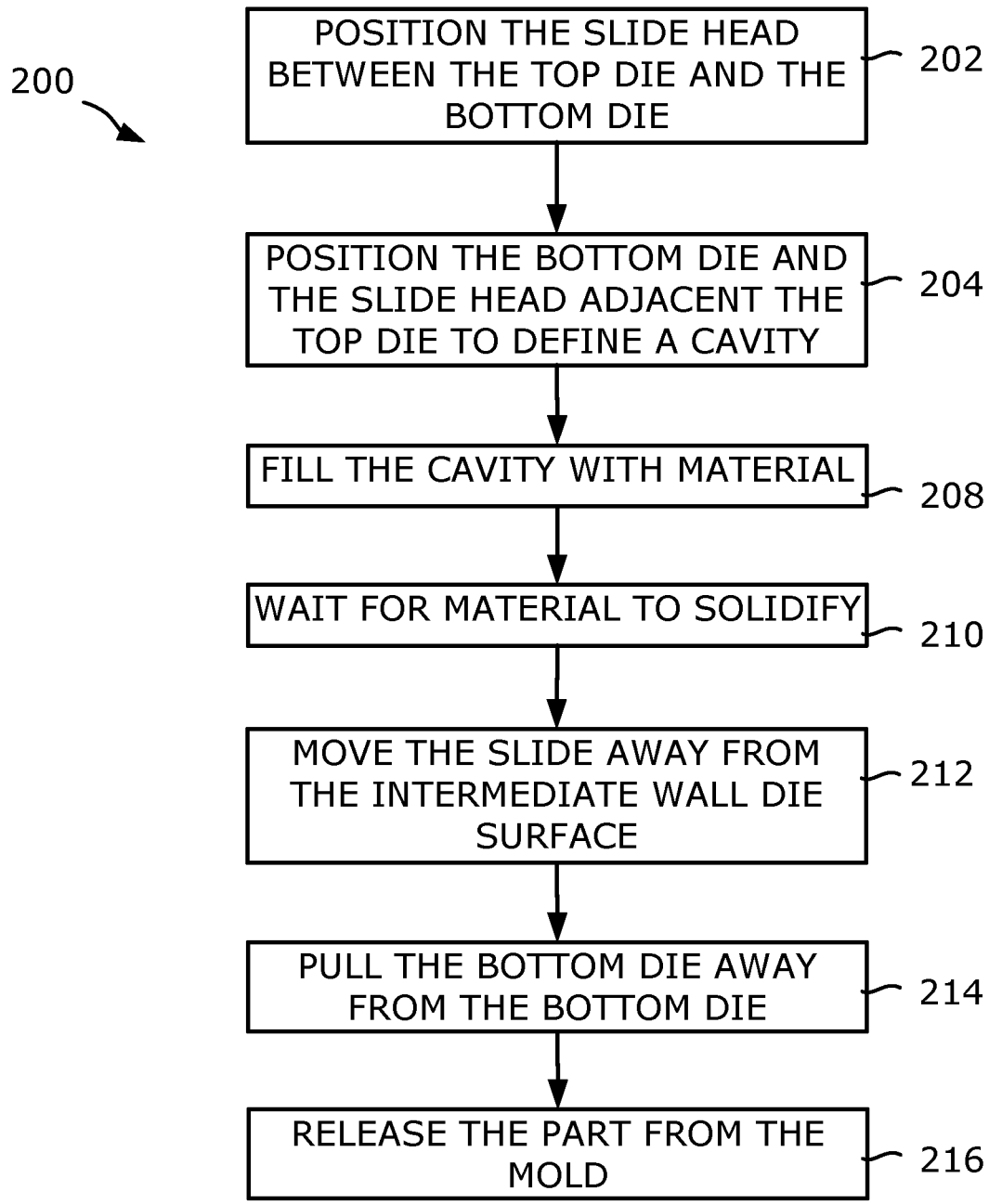
FIG. 17 is a flowchart of a process for making the cover.
Figure 18:
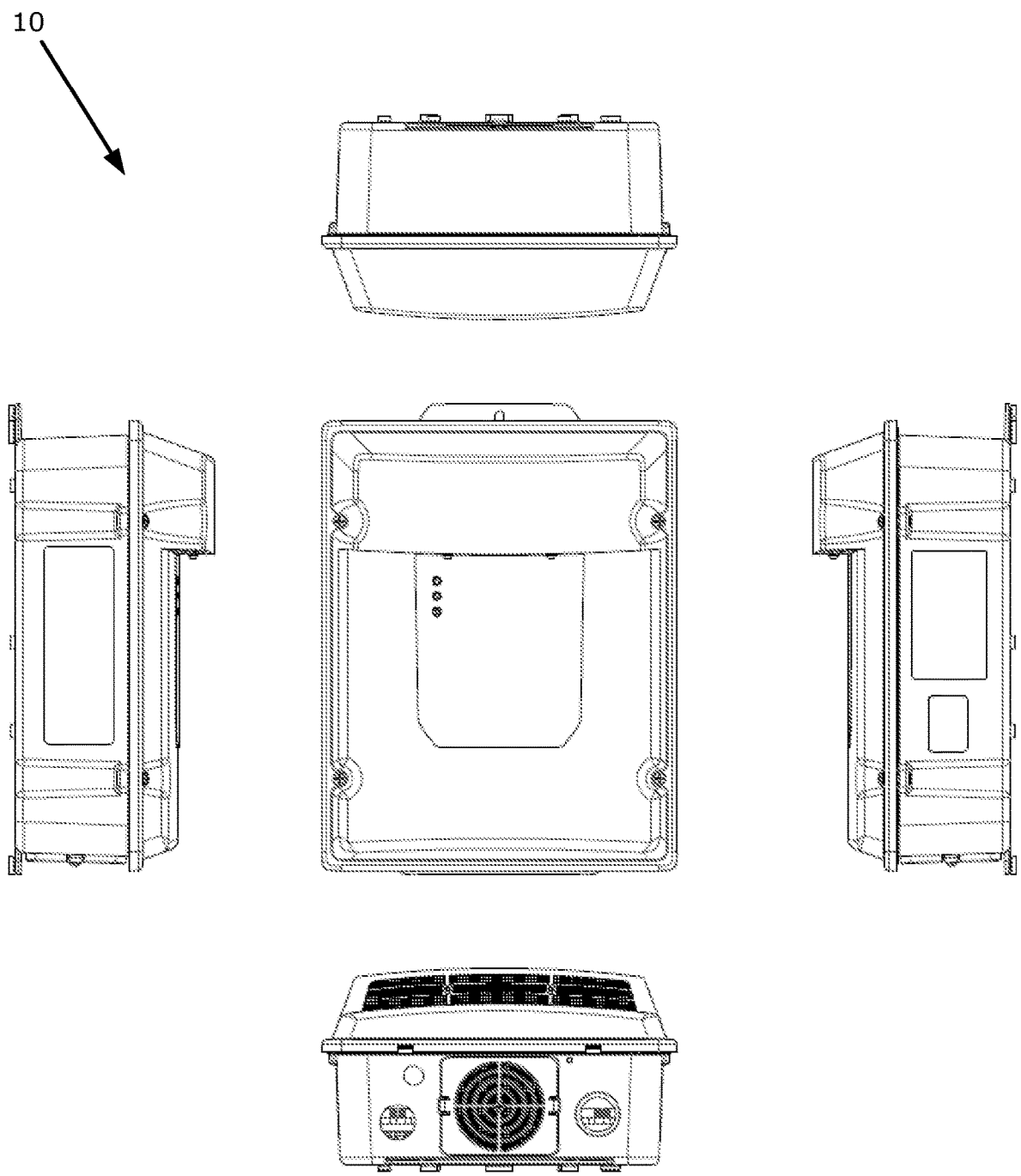
FIG. 18 shows isometric views of the enclosure of FIG. 1.
Figure 19:
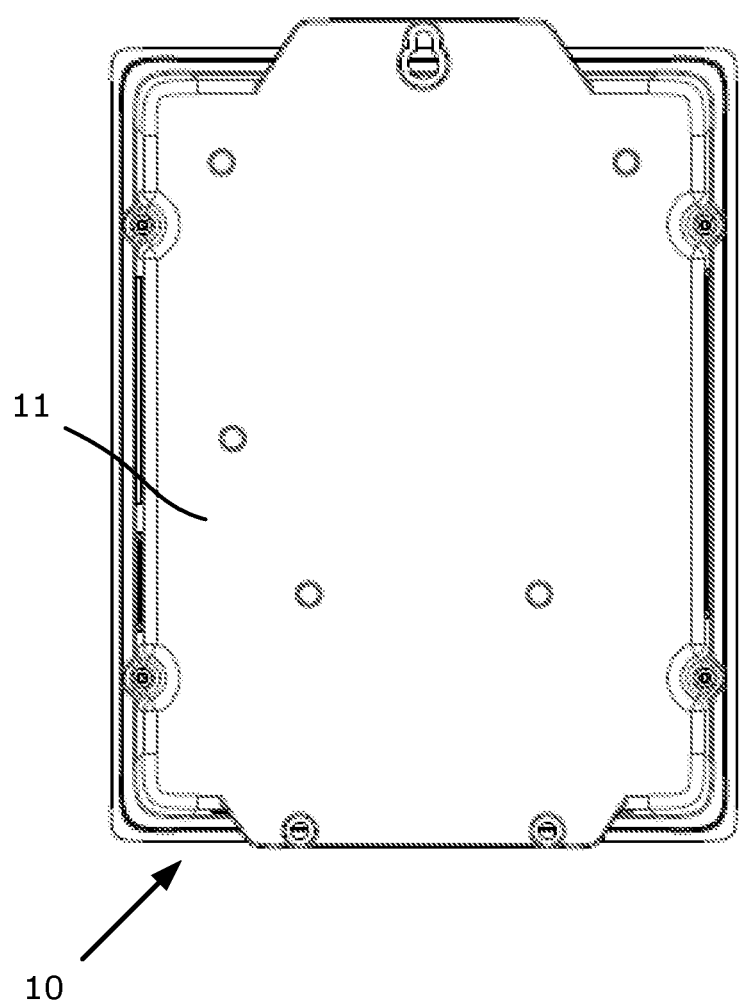
FIG. 19 shows a back view of the base of the enclosure of FIG. 1.

At 210, the method continues by waiting until the material solidifies and, at 212, the method continues by moving the slide away from the intermediate surface of the top die until the lower surface of the slide clears the extending portion of the lower wall that has been formed (FIG. 14). The bottom die is moved away from the top die (FIG. 13), at 214, so that the slide can be translated to clear. A suitable mechanism may be provided to cause the die and slide to move down and away in a repetitive manner, such that 212 and 214 occur concurrently, at least in part. For example, an arrangement comprising cooperating worm gears may couple the bottom die and the stem of the slide. FIG. 15 shows the bottom die and the slide removed from the top die. Then, at 216, the method continues by releasing the part from the mold, as shown in FIG. 16. Releasing may entail applying pressure against the part through cavities (not shown) in the dies, as is known in the art.

In one variation, the mold further comprises a pin (not shown) extending from the bottom die toward the top die, the pin forming blind hole 51 at a juncture between the intermediate wall and a lateral wall of the one-piece part.

Advantageously, the method described above permits formation of the intermediate wall without sliding a die on the exterior surfaces of the part, thus forming a more appealing exterior surface.

It should be understood that a complex part, in which two walls overlap to form an interior wall portion that prohibits removal of the dies without some lateral translation of one of the dies relative to the interior wall after it has been formed, need not have lateral walls or curved portions as described above.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A one-piece part comprising:
   an upper wall;
   a lower wall having an exterior portion and an interior portion, the interior portion overlapping the upper wall;
   lateral walls connecting the upper wall to the lower wall;
   an intermediate wall connecting the upper wall to the lower wall, the intermediate wall extending between the lateral walls;
   a bottom wall connecting the lateral walls and the lower wall; and
   a top wall connecting and extending between the lateral walls, the top wall being connected to the upper wall and having a common edge therewith,
   wherein the lateral walls, the top wall, the bottom wall, the exterior portion of the lower wall, the intermediate wall, and the upper wall have exterior surfaces and interior surfaces, the interior surfaces defining a volume of the one-piece part, and
   wherein the interior portion of the lower wall extends into said volume.

2. The one-piece part of claim 1, wherein the interior portion of the lower wall extends from the intermediate wall toward the top wall and the exterior portion of the lower wall extends from the intermediate wall away from the top wall.

3. The one-piece part of claim 2, wherein the interior portion and the exterior portion lie on a common plane.

4. The one-piece part of claim 3, wherein the upper wall and the lower wall lie on parallel planes.

5. The one-piece part of claim 1, wherein the intermediate wall comprises through holes.

6. The one-piece part of claim 5, wherein the intermediate wall comprises parallel ribs, and wherein the ribs define the through-holes.

7. The one-piece part of claim 6, wherein the ribs have surfaces that lie in planes that are parallel to lower wall.

8. The one-piece part of claim 1, wherein at least one of the lateral walls comprises a curved portion adjacent the intermediate wall with a blind hole extending between the upper wall and the lower wall adjacent to the curved portion.

9. The one-piece part of claim 1, wherein the interior portion of the lower wall extends into said volume from the interior surface of the intermediate wall toward the interior surface of the top wall.

10. An enclosure comprising:
    a body; and
    a cover configured to form an enclosed volume when the cover is attached to the body, the cover including:
    an upper wall;
    a lower wall having an exterior portion and an interior portion, the interior portion overlapping the upper wall;

lateral walls connecting the upper wall to the lower wall; and an intermediate wall connecting the upper wall to the lower wall, the intermediate wall extending between the lateral walls;

a bottom wall connecting the lateral walls and the lower wall; and a top wall connecting and extending between the lateral walls, the top wall being connected to the upper wall and having a common edge therewith, wherein the lateral walls, the top wall, the bottom wall, the exterior portion of the lower wall, the intermediate wall, and the upper wall have exterior surfaces and interior surfaces, the interior surfaces defining a volume of the one-piece part, and wherein the interior portion of the lower wall extends into said volume.

11. The enclosure of claim 10, wherein the interior portion of the lower wall extends from the intermediate wall toward the top wall and the exterior portion of the lower wall extends from the intermediate wall away from the top wall.

12. The enclosure of claim 11, wherein the interior portion and the exterior portion lie on a common plane.

13. The enclosure of claim 12, wherein the upper wall and the lower wall lie on parallel planes.

14. The enclosure of claim 10, wherein the intermediate wall comprises through holes.

15. The enclosure of claim 14, wherein the intermediate wall comprises parallel ribs, and wherein the ribs define the through-holes.

16. The enclosure of claim 15, wherein the ribs have surfaces that lie in planes that are parallel to lower wall.

17. The enclosure of claim 10, wherein at least one of the lateral walls comprises a curved portion adjacent the intermediate wall with a blind hole extending between the upper wall and the lower wall adjacent to the curved portion.

18. The enclosure of claim 10, wherein the interior portion of the lower wall extends into said volume from the interior surface of the intermediate wall toward the interior surface of the top wall.

19. A method of forming a one-piece part, the method comprising:

providing a mold comprising a top die, a bottom die, and a slide including a head and a stem, the head having an upper surface, an intermediate surface, and a lower surface, and the top die comprising an upper surface, an intermediate surface, and a lower surface;

positioning the bottom die and the slide adjacent the top die with the intermediate surface of the head of the slide adjacent the intermediate surface of the top die;

filling the cavity with material;

waiting until the material to solidifies;

moving the slide away from the intermediate surface of the top die until the lower surface of the slide clears the interior portion of the lower wall;

separating the top die and the bottom die; and releasing the one-piece part from the bottom die or the top die, wherein the one-piece part comprises an upper wall, a lower wall having an exterior portion and an interior portion, the interior portion overlapping the upper wall, lateral walls connecting the upper wall to the lower wall, a top wall connecting and extending between the lateral walls, the top wall being connected to the upper wall and having a common edge therewith, a bottom wall connecting the lateral walls and the lower wall, and an intermediate wall connecting the upper wall to the lower wall, the intermediate wall extending between the lateral walls, wherein the lateral walls, the exterior portion of the lower wall, the intermediate wall, the top wall, the bottom and the upper wall have exterior surfaces and interior surfaces, the interior surfaces defining a volume of the one-piece part, and wherein the interior portion of the lower wall extends into said volume.

20. The method of claim 19, wherein the mold further comprises a pin extending from the bottom die toward the top die, the pin forming a blind hole at a juncture between the intermediate wall and a lateral wall of the one-piece part.

21. The method of claim 19, wherein in the one-piece part the interior portion of the lower wall extends into said volume from the interior surface of the intermediate wall toward the interior surface of the top wall.

* * * * *